(12) United States Patent
Ortega

(10) Patent No.: US 7,889,827 B2
(45) Date of Patent: Feb. 15, 2011

(54) METHOD AND APPARATUS FOR REMOVING TACK WELDS ON REACTOR VESSEL COMPONENTS IN A NUCLEAR REACTOR

(75) Inventor: Frank Ortega, San Jose, CA (US)

(73) Assignee: General Electric Company, Schenectady, NY (US)

( * ) Notice: Subject to any disclaimer, the term of this patent is extended or adjusted under 35 U.S.C. 154(b) by 169 days.

(21) Appl. No.: 11/342,561

(22) Filed: Jan. 31, 2006

(65) Prior Publication Data
US 2007/0177708 A1 Aug. 2, 2007

(51) Int. Cl.
| | |
|---|---|
| G21C 19/00 | (2006.01) |
| B23B 47/00 | (2006.01) |
| B23K 11/30 | (2006.01) |
| B23K 9/00 | (2006.01) |
| B23K 31/02 | (2006.01) |
| B23H 1/04 | (2006.01) |

(52) U.S. Cl. ............... 376/260; 408/67; 408/97; 219/65.11; 219/69.15; 219/69.1; 219/61.6; 219/61.7

(58) Field of Classification Search ............ 376/294, 376/260, 302, 372; 408/67, 97, 204
See application file for complete search history.

(56) References Cited

U.S. PATENT DOCUMENTS

| | | | | |
|---|---|---|---|---|
| 4,251,706 A | * | 2/1981 | Frei et al. ............. | 219/69.14 |
| 4,337,385 A | * | 6/1982 | Maropis et al. ......... | 219/69.2 |
| 4,543,460 A | * | 9/1985 | Inoue ................ | 219/69.17 |
| 4,665,293 A | * | 5/1987 | Crespin ............... | 219/69.2 |
| 4,690,593 A | * | 9/1987 | Nee et al. ............. | 408/80 |
| 5,070,589 A | * | 12/1991 | Howell et al. ......... | 29/426.5 |
| 5,268,550 A | * | 12/1993 | Blocquel et al. ........ | 219/69.17 |
| 5,687,205 A | * | 11/1997 | Matsumoto et al. ...... | 376/260 |
| 6,233,301 B1 | * | 5/2001 | Robergeau ............ | 376/302 |
| 6,309,147 B1 | * | 10/2001 | Matsumoto et al. ...... | 408/67 |
| 7,154,063 B2 | * | 12/2006 | Shih et al. ............ | 219/69.15 |
| 7,217,229 B2 | * | 5/2007 | Hagihara et al. ........ | 483/7 |
| 2004/0190671 A1 | * | 9/2004 | Wivagg .............. | 376/260 |

FOREIGN PATENT DOCUMENTS

| | | | | |
|---|---|---|---|---|
| JP | 200027538 A | * | 3/1999 | |
| JP | 2000275382 A | * | 10/2000 | |

OTHER PUBLICATIONS

Sakamaki, Miyazaki et al., JP200027538A, English translation USPTO Washington DC. 2008.*
Translation JP2000275382MTRANS, USPTO, 2008.*
Mar. 4, 2010 Claim Amendment (Entered).*

* cited by examiner

*Primary Examiner*—Rick Palabrica
*Assistant Examiner*—Erin M Boyd
(74) *Attorney, Agent, or Firm*—Harness, Dickey & Pierce

(57) ABSTRACT

An electrical discharge machining (EDM) tool and method for removing tack welds on a component in a reactor pressure vessel are disclosed. The tool may include a motor, a housing which engages the component having tack welds, an electrode, positioned in the housing, a first plate, and a second plate attached to the electrode. The second plate actuates to align the electrode to the tack weld, and the electrode is discharged to remove the tack welds from the component.

15 Claims, 5 Drawing Sheets

METHOD AND APPARATUS FOR REMOVING TACK WELDS ON REACTOR VESSEL COMPONENTS IN A NUCLEAR REACTOR

BACKGROUND OF THE INVENTION

1. Field of the Invention

This invention relates generally to a method and apparatus for removing tack welds from reactor vessel components via electro-discharge machining (EDM).

2. Description of Related Art

Electrical Discharge Machining (EDM) is a common technique used for machining hard metals or those that would be impossible to machine with traditional techniques. EDM may be well-suited for cutting intricate contours or delicate cavities that would be difficult to produce with a grinder, an end mill or other cutting tools. EDM removes metal by producing a rapid series of repetitive electrical discharges. These electrical discharges are passes between an electrode and the piece of metal being machined. The repetitive discharges may remove the unwanted metal or create a set of successively deeper craters in the metal until a final shape is produced. Because EDM works with materials that are electrically conductive, metals that can be machined may include, for example, but not limited to, hastalloy, hardened tool-steel, titanium, carbide, inconel and kovar.

EDM is used to machine metals in a reactor pressure vessel (RPV) of a boiling water reactor (BWR). A typical reactor pressure vessel at a BWR has a generally cylindrical shape and is closed at both ends, e.g., by a bottom head and a removable top head. A top guide typically is spaced above a core plate within the RPV. A core shroud, or shroud, typically surrounds the core and is supported by a shroud support structure. Particularly, the shroud has a generally cylindrical shape and surrounds both the core plate and the top guide. There is a space or annulus located between the cylindrical reactor pressure vessel and the cylindrically-shaped shroud.

FIG. 1 is a schematic, partial cross sectional view, with parts cut away, of a reactor pressure vessel (RPV) 20 for a boiling water reactor. The RPV 20 has a generally cylindrical-shape and is closed at one end by a bottom head and at its other end by removable top head (not shown). A top guide (not shown) is situated above a core plate 22 within RPV 20. A shroud 24 surrounds core plate 22 and is supported by a shroud support structure 26. A downcomer annulus 28 is formed between the shroud 24 and a sidewall 30 of RPV 20.

An annulet nozzle 32 extends through sidewall 30 of the RPV 20 and is coupled to a jet pump assembly 34. The jet pump assembly 34 includes a thermal sleeve 36 which extends through nozzle 32, a lower elbow (only partially visible in FIG. 1), an inlet riser pipe 38 coupled to a pair of jet pumps 35, and a jet pump riser brace assembly 40. Thermal sleeve 36 is secured at a first end (not shown) to a second end of the lower elbow. The first end of thermal sleeve 36 is welded to the second end of the lower elbow. A first end of the lower elbow is similarly secured or welded to one end of the riser pipe 38. The riser pipe 38 extends between and substantially parallel to the shroud 24 and sidewall 30. The jet pumps 35 are circumferentially distributed around the core shroud 24. The riser pipe 38 is coupled to the two jet pumps 35 by a transition assembly 39.

FIG. 2 is a perspective view of a jet pump assembly 34. Each jet pump 35 includes a jet pump nozzle 64, a suction inlet 66, an inlet mixer 41, and a diffuser 42. The jet pump nozzle 64 may be positioned in the suction inlet 66 which may be located at a first end (not shown) of inlet mixer 41. The transition assembly 39 may include a base piece 70 and two elbows. Each elbow is coupled to a jet pump nozzle 64. Locking arms 72, 74, 76, and 78 extend from the transition assembly base piece 70. Jet pump beams 86 are connected between the locking arms 72, 74, 76 and 78. One jet pump beam 86 is engaged to a first pair of locking arms 72 and 76, and another jet pump beam 86 is engaged to a second pair of locking arms 74 and 78, as shown in FIG. 2. Each jet pump beam 86 includes a tongue member 81 at an end thereof which engages notches 82 in the locking arms 72, 74, 76 and 78 for preventing and/or reducing movement (e.g., rotational) of a corresponding beam bolt 94. The jet pump beams 86 engage locking arms 72, 74, 76 and 78 by sliding the tongue member 81 into the notches 82.

The jet pump beams 86 are generally attached to the inlet mixer 41 by a retainer plate (not shown) which is locked to the inlet mixer 41 with a retainer bolt 90. To lock the retainer bolt 90, tack welds are applied to prevent the retainer bolt 90 from vibrating loose. However, jet pump beams 86 occasionally need to be repaired or replaced. Thus, in order to repair/replace the jet pump beams 86, the entire inlet mixer 41 is removed and moved into an open area to allow better access to separate the jet pump beams 86 from the inlet mixer 41 (e.g., by breaking the tack welds 91, removing the retainer bolt 90 and removing the retainer plate). However, this procedure is time consuming, labor intensive, and requires additional equipment on-site.

Other techniques of breaking the tack welds 91 and removing the retainer bolt 90 use a torque multiplier to remove the tack welds 91. However, torque multipliers are bulky and large, and thus cannot fit in the area of the jet pump beams 86.

SUMMARY OF THE INVENTION

An exemplary embodiment of the present invention is directed to an electrical discharge machining (EDM) tool for removing tack welds from surfaces of reactor pressure vessel components. The tool may include a motor, a housing which engages a retainer bolt having tack welds, a moveable electrode plate positioned in the housing, a first plate, and a second plate attached to the electrode.

In a further exemplary embodiment, the second plate actuates to align the electrode plate to the tack weld.

In yet a further exemplary embodiment, the electrode plate electrically discharges electrodes to remove tack welds from the components.

Another exemplary embodiment of the present invention is directed to a method of removing tack welds by electrical discharge machining (EDM). In the method, an EDM tool is installed over a component. The tool includes a housing, a first plate, a second plate and an electrode plate. The second plate is actuated to move the electrode in the housing. The, electrode plate electrically discharges electrodes to remove the tack welds. The EDM tool is then removed from the component.

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limitative of the present invention.

DETAILED DESCRIPTION OF EXEMPLARY EMBODIMENTS

These figures are intended to illustrate the general characteristics of method and apparatus of exemplary embodiments of this invention, for the purpose of the description of such exemplary embodiments herein. These drawings are not, however, to scale and may not precisely reflect the characteristics of any given embodiment, and should not be interpreted as defining or limiting the range of values or properties of exemplary embodiments within the scope of this invention. The relative dimensions and size of the jet pump assembly may be reduced or exaggerated for clarity. Like numerals are used for like and corresponding parts of the various drawings.

Figure 1:
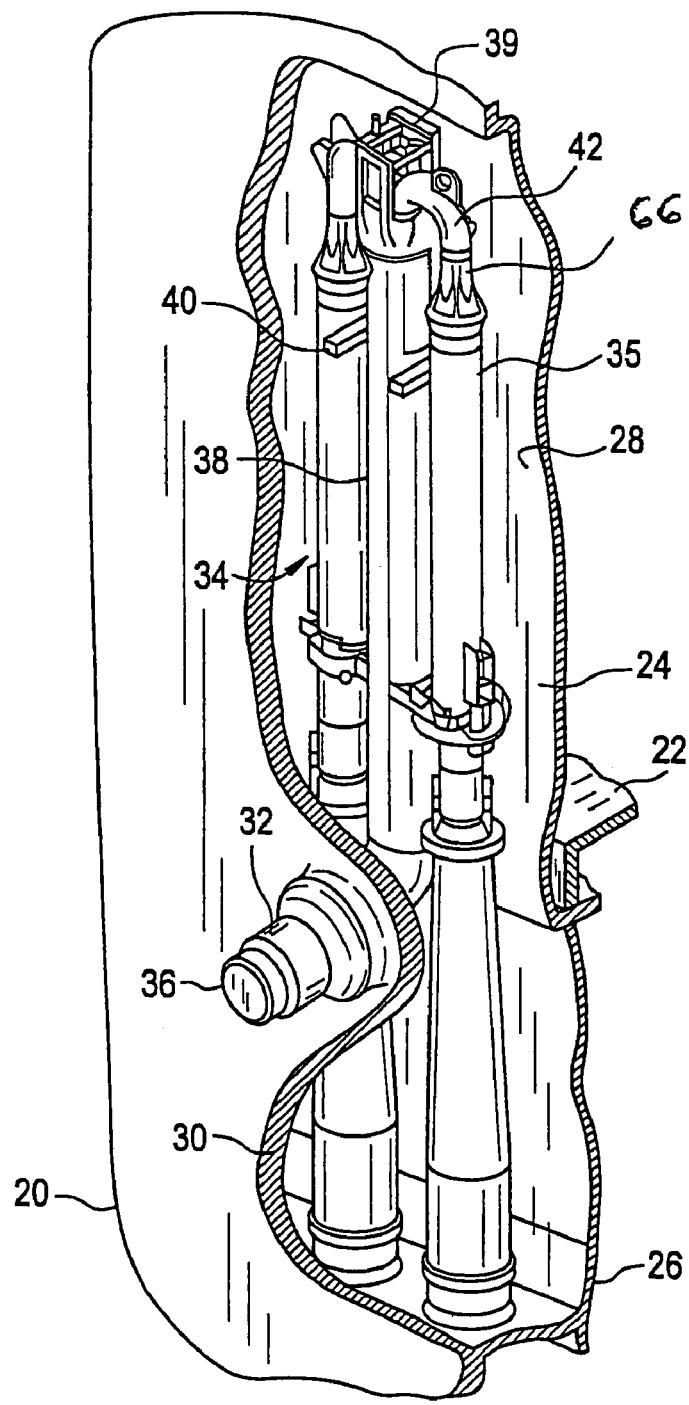
FIG. 1 is a schematic, partial cross-sectional view, with parts cut away, of a reactor pressure vessel (RPV) of a boiling water nuclear reactor.
Figure 2:
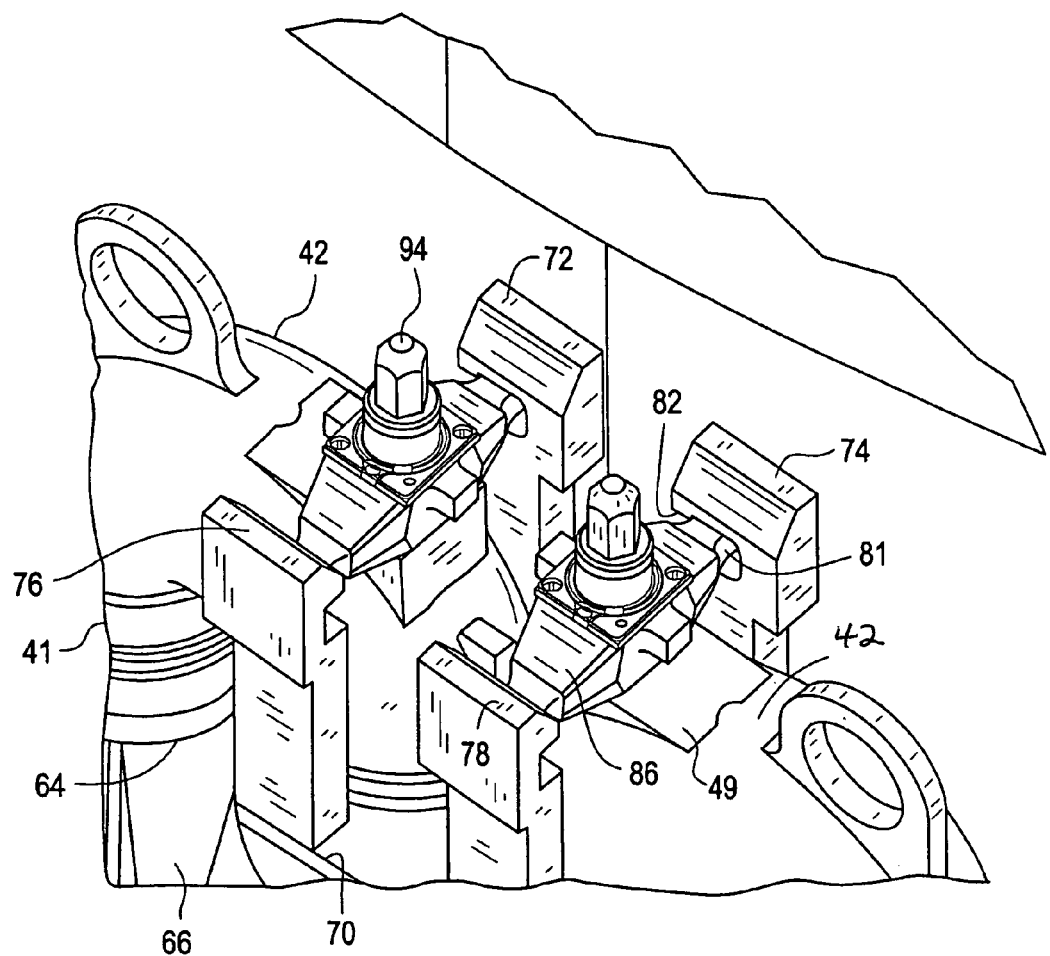
FIG. 2 illustrates a riser brace assembly in accordance with an exemplary embodiment of the invention.
Figure 3:
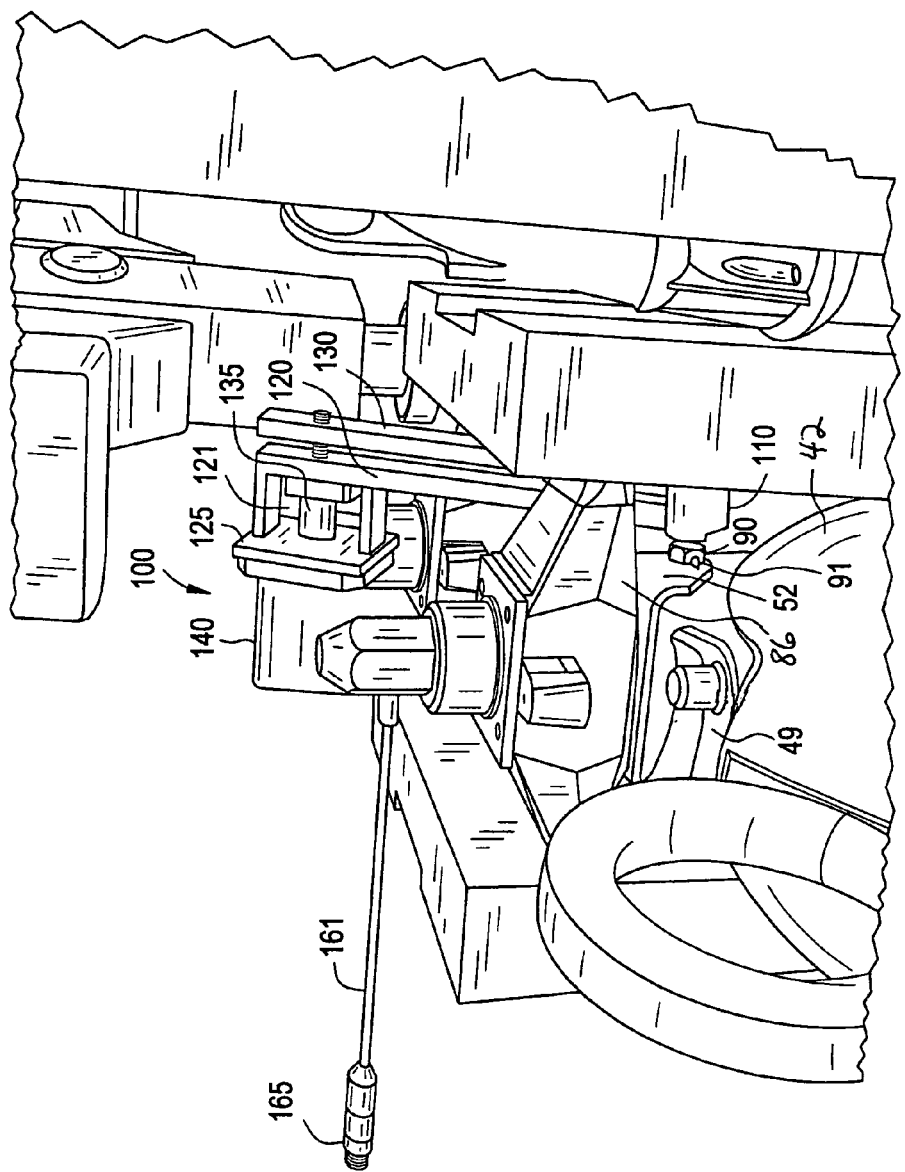
FIG. 3 is a schematic view of an EDM tool operable on a jet pump beam bolt in accordance with an exemplary embodiment of the invention.

FIG. 3 is a schematic view of an EDM tool 100 operable on a jet pump beam bolt in accordance with an exemplary embodiment of the invention. It is appreciated that the portion of the jet pump assembly 34 shown in FIG. 3 is similar to FIG. 2, and will not be described in detail.

Referring to FIG. 3, the jet pump beams 86 are attached to the inlet mixer 41. A retainer plate 52 for supporting the jet pump beams 86 is attached below the jet pump beams 86. The retainer plate 52 includes an opening which aligns with an opening on a block 49. Once aligned, a retainer bolt 90 may be inserted for fastening the retainer plate 52 to the inlet mixer 41. The retainer bolt 90 may include tack welds 91 for reinforcing the retainer bolt 90. The tack welds 91 are secured to the retainer plate 52 in a conventional manner using known welding processes.

The EDM tool 100 engages the retainer bolt 90. The EDM tool 100 is generally elongated (or linear) in shape so as to engage the retainer bolt 90. Due to the design and operability of the EDM tool 100, the EDM tool 100 may easily maneuver around the area of the jet pump assembly 34.

The EDM tool 100 includes a bolt housing 110 for engaging (or indexing off) a surface of the head of retainer bolt 90. In an example, the surface of the head of retainer bolt 90 may be hexagonal and thus the housing may assume a complimentary hexagonal shape. However, it should be appreciated that other shapes of the head of retainer bolt 90 may be used, so long as the bolt housing 110 corresponds to the shape of the head of retainer bolt 90.

The bolt housing 110 is attached to a support frame plate 120 extending from the bolt housing 110 as shown in FIG. 3. The design of the support frame plate 120 may be construed as a generally narrow, extended linear slide shape. The support frame plate 120 is generally planar extending from the bolt housing 110, and includes a gap 121 at an opposite end thereof. The gap 121 is designed to encompass ball screw nut 135. A platform 125 is formed on top of gap 121 for holding an EDM motor 140. The EDM motor 140 may be attached to the platform 125 with fasteners 128 (see FIG. 4), i.e., screws or any other equivalent attachment means. The EDM motor 140 can be a conventional DC stepper that is typically used in EDM applications. The EDM motor 140 includes an extending wire 161 thereto for supplying power. As shown in FIG. 3, the extending wire 161 includes a connector 165 for connecting to a power supply (not shown).

As an example, the support frame plate 120 and the platform 125 may be made from stainless steel. However, it should be appreciated that other materials such as aluminum may be employed. It should further be appreciated that the support frame plate 120 and platform 125 may be formed as a unitary piece or as separate components fastened together.

An actuating plate 130 (which parallels support frame plate 120) extends into the bolt housing 110. As will be described in detail later, the actuating plate 130 is used to engage an electrode which will be energized to release tack welds 91.

Figure 5A:
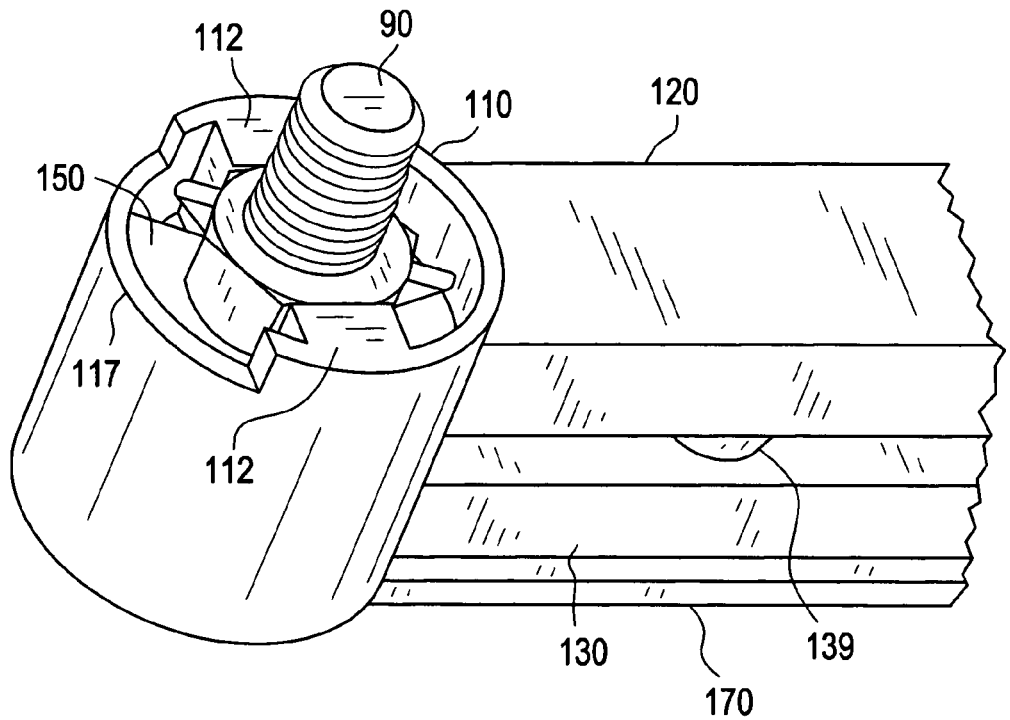
FIGS. 5A and 5B are detailed schematic views of a head of the EDM tool in accordance with an exemplary embodiment of the invention.

The actuating plate 130 is attached to an electrode plate 150 (shown in FIG. 5) in the bolt housing 110. The actuating plate 130 provides the movement for engaging the electrode plate 150 to the head of retainer bolt 90 and electrically discharging the electrodes for removal of the tack welds 91. The electrode plate 150 may be made from graphite or silver tungsten, and/or materials having equivalent conductive properties.

Figure 4:
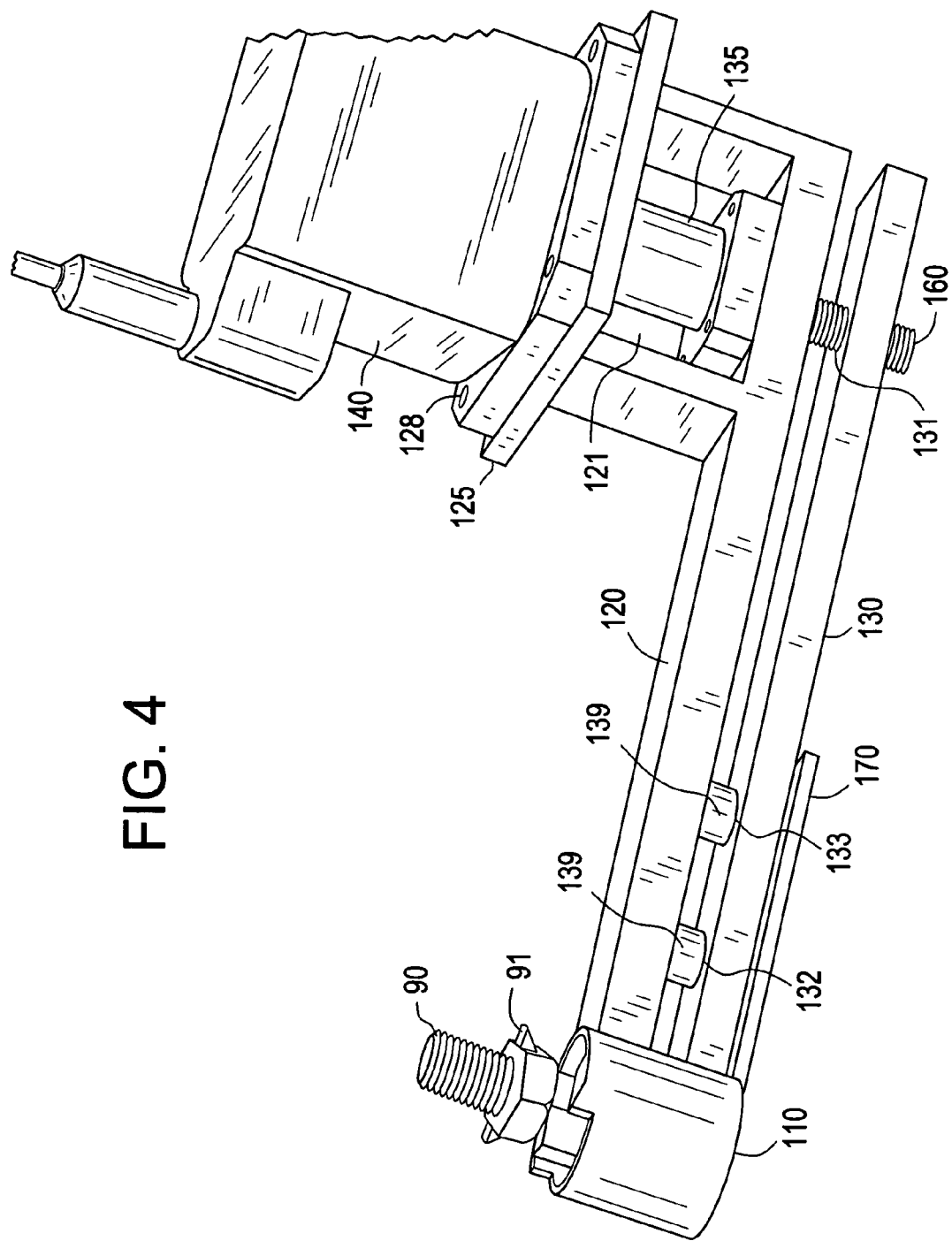
FIG. 4 is a detailed schematic view of the EDM tool as shown in FIG. 3.

FIG. 4 is a detailed schematic view of an EDM tool 100 of FIG. 3 in further detail. FIG. 4 shows the EDM tool 100 without the surrounding jet pump assembly components. The EDM tool 100 may include a bolt housing 110, a support frame plate 120, an actuating plate 130, a ball screw nut 135, an EDM motor 140, and an electrode plate 150 (see FIGS. 5A and 5B).

The bolt housing 110 engages the retainer bolt 90 for removing the tack welds 91. When the bolt housing 110 is installed on the retainer bolt 90, the EDM motor 140 operates via the ball screw nut 135 to move (retract and extend) the electrode plate 150 located in the bolt housing 110. The ball screw nut 135 (moving in gap 121, as discussed above) rotates a ball screw 160 to move the actuating plate 130 which then ultimately moves the electrode plate 150 a distance of approximately one inch. An extension piece 170 extending from the bottom of the bolt housing 110 prevents the actuating plate 130 from moving out of the ball screw 160 (e.g., acts as a stop piece). The extension piece 170 may be made from the same material as the support frame plate 120 and/or supports 139.

The actuating plate 130 may include at least three holes 131, 132 and 133. Hole 131 receives a ball screw 160 extending from the ball screw nut 135; and holes 132 and 133 receive supports 139 extending from the support frame plate 120. The supports 139 may provide structural support for reinforcement, and may also be used for linear guides (e.g., when the actuating plate 130 is moving). The supports 139 may be made from the same material as the support frame plate 120. The actuating plate 130 may be made from the same material as the support frame plate 120, for example.

The bolt housing 110 includes index members 112 (shown in FIGS. 5A and 5B) which correspond to the shape of the head of retainer bolt 90. The index members 112 allow alignment to, for example, a hexagonal head of retainer bolt 90. This assures proper alignment to the welds. As an exemplary embodiment, two index members 112 extend inwardly in the bolt housing 110 to receive the retainer bolt 90. It should be appreciated that more than two index members 112 may be used in the bolt housing 110. It should further be appreciated that other design of the index member 112 may be implemented. The bolt housing 110 includes an indent 117 at a top end thereof to facilitate the insertion of the retainer bolt 90 into the bolt housing 110.

Figure 5B:
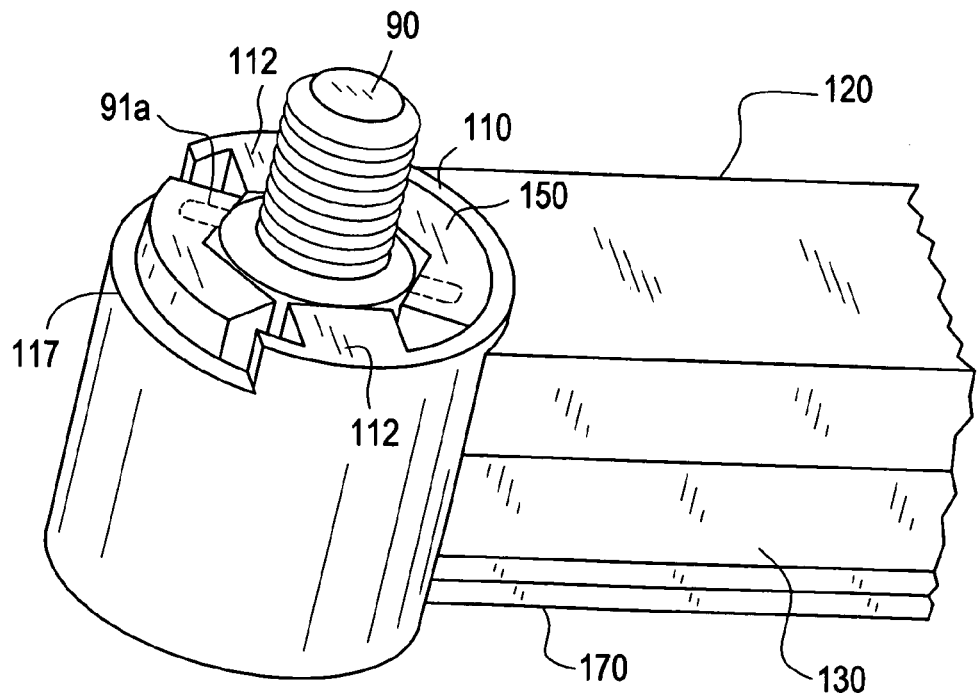

As discussed above, the electrode plate 150 may retract and extend in the bolt housing 110. During the placing of the bolt housing 110 onto the retainer bolt 90, the electrode plate 150 is in the retracted position (shown in FIG. 5A). During the removal of the tack welds 91, the electrode plate 150 is in the extended position (shown in FIG. 5B). In the extended position, the electrodes are discharged to remove the tack weld 91. FIG. 5B illustrates the retainer bolt 90 with the tack welds 91 removed (e.g., reference character 91*a* indicates where tack welds 91 previously were located). Upon the removal of the EDM tool 100, the electrode plate 150 retracts to disengage from the retainer bolt 90.

Once the tack welds 91 are consumed by the discharging of the electrode plate 150 and the EDM tool 100 is removed from the work area, the retainer bolt 90 is removed by a standard low profile right angle nut runner. Since the tack welds 91 are no longer present, the bolt removal torque is low. The invention being thus described, it will be obvious that the same may be varied in many ways. Such variations are not to be regarded as departure from the spirit and scope of the invention, and all such modifications as would be obvious to one skilled in the art are intended to be included within the scope of the following claims.

What is claimed:

1. An electrical discharge machining (EDM) tool configured to remove tack welds from surfaces of components of a reactor pressure vessel, the EDM tool comprising:
 a motor;
 a housing;
 an electrode plate configured to be disposed in a first position and a second position;
 a first plate; and
 a second plate;
 wherein the housing is configured to directly contact a retainer bolt having the tack welds,
 wherein in a first position of the electrode plate, the electrode plate is retracted within the housing,
 wherein in a second position of the electrode plate, the electrode plate partially extends from the housing,
 wherein the motor moves the second plate relative to the first plate in order to change the electrode plate from the first position to the second position or from the second position to the first position, and
 wherein in the second position of the electrode plate, the electrode plate is aligned with the tack welds, such that electrically discharging via the electrode plate removes the tack welds from the retainer bolt.

2. The EDM tool of claim 1, further comprising:
 a ball screw; and
 a ball screw nut;
 wherein the ball screw nut is configured to rotate the ball screw in order to actuate the second plate.

3. The EDM tool of claim 2, wherein the ball screw nut is disposed on the first plate.

4. The EDM tool of claim 1, wherein the housing includes a pair of index members, and
 wherein the pair of index members are configured to receive the retainer bolt.

5. The EDM tool of claim 1, wherein the housing includes at least two index members, and
 wherein the index members are positioned inwardly toward a center of the housing.

6. The EDM tool of claim 1, wherein the housing includes an indent configured to facilitate insertion of the retainer bolt into the housing.

7. The EDM tool of claim 1, wherein the electrode plate is made from graphite or silver tungsten.

8. The EDM tool of claim 1, wherein the first plate includes support members for guiding the second plate.

9. The EDM tool of claim 1, wherein the first plate is made from stainless steel or aluminum, and
 wherein the second plate is made from stainless steel or aluminum.

10. The EDM tool of claim 1, wherein the first plate is made from stainless steel or aluminum.

11. The EDM tool of claim 1, wherein the second plate is made from stainless steel or aluminum.

12. The EDM tool of claim 1, wherein when the housing makes contact with the retainer bolt prior to removal of the tack welds, the electrode plate is in the first position.

13. The EDM tool of claim 1, wherein when the housing breaks contact with the retainer bolt after removal of the tack welds, the electrode plate is in the first position.

14. The EDM tool of claim 1, wherein the EDM tool is configured to remove the tack welds from the retainer bolts while the retainer bolts are in a substantially horizontal orientation.

15. The EDM tool of claim 1, wherein the EDM tool is configured to remove the tack welds from the retainer bolts while the retainer bolts are disposed between the reactor pressure vessel and a shroud within the reactor pressure vessel.

* * * * *